United States Patent
Knebel et al.

(10) Patent No.: US 7,390,998 B2
(45) Date of Patent: Jun. 24, 2008

(54) RASTER MICROSCOPE AND METHOD FOR THE ANALYSIS OF BIOLOGICAL SAMPLES BY MEANS OF A RASTER MICROSCOPE HAVING A MANIPULATION LIGHT BEAM AND EXCITATION LIGHT BEAM SUCCESSIVELY ILLUMINATED WITH A TEMPORAL INTERVAL

(75) Inventors: Werner Knebel, Kronau (DE); Jan Schroeder, Mannheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 54 days.

(21) Appl. No.: 11/571,502

(22) PCT Filed: Jun. 30, 2005

(86) PCT No.: PCT/EP2005/053116

§ 371 (c)(1),
(2), (4) Date: Dec. 29, 2006

(87) PCT Pub. No.: WO2006/003178

PCT Pub. Date: Jan. 12, 2006

(65) Prior Publication Data

US 2007/0272842 A1    Nov. 29, 2007

(30) Foreign Application Priority Data

Jul. 7, 2004    (DE)    ........................ 10 2004 032 952

(51) Int. Cl.
G02B 7/04    (2006.01)
(52) U.S. Cl. ..................................... 250/201.3; 250/235

(58) Field of Classification Search .............. 250/201.3, 250/235, 216, 208.1, 559.4, 306, 307, 458.1, 250/459.1, 461.1, 461.2; 359/385, 386, 204–210, 359/214
See application file for complete search history.

(56) References Cited

U.S. PATENT DOCUMENTS

| | | | | |
|---|---|---|---|---|
| 5,202,744 A | * | 4/1993 | Louis | .......................... 356/73 |
| 6,094,300 A | | 7/2000 | Kashima et al. | |

(Continued)

FOREIGN PATENT DOCUMENTS

DE    102 33 549 A1    2/2004

(Continued)

OTHER PUBLICATIONS

Braekmans, K. et al. 3-Dimensional Fluorescence Recovery after Photobleaching... Biophysical Journal, Oct. 2003, pp. 2240-2252, v. 85, The Biophysical Society, Bethesda, MD, USA.

(Continued)

*Primary Examiner*—Que T Le
(74) *Attorney, Agent, or Firm*—Houston Eliseeva LLP (57) ABSTRACT

Disclosed is a method for analyzing biological samples by means of a scanning microscope. According to said method, at least one screen dot is repeatedly and successively illuminated with a manipulating light beam and an exciting light beam. The interval between the time of illumination with the manipulating light beam and the time of illumination with the exciting light beam is modified, and the fluorescent light yield is measured in accordance with said interval.

37 Claims, 4 Drawing Sheets

U.S. PATENT DOCUMENTS

2002/0020800 A1  2/2002 Knebel et al.
2002/0196535 A1  12/2002 Knebel et al.
2003/0197924 A1  10/2003 Tatsuo

FOREIGN PATENT DOCUMENTS

EP    1 186 930 A2    3/2002
EP    1 196 930 A     3/2002

OTHER PUBLICATIONS

International Preliminary Report on Patentability from International Application No. PCT/EP2005/053116, filed on Jun. 30, 2005.

* cited by examiner

RASTER MICROSCOPE AND METHOD FOR THE ANALYSIS OF BIOLOGICAL SAMPLES BY MEANS OF A RASTER MICROSCOPE HAVING A MANIPULATION LIGHT BEAM AND EXCITATION LIGHT BEAM SUCCESSIVELY ILLUMINATED WITH A TEMPORAL INTERVAL

FIELD OF THE INVENTION

The invention relates to a method for analyzing biological samples with a scanning microscope.

The invention further relates to a scanning microscope with a least one light source for producing a manipulation light beam and an excitation light beam, which sequentially illuminate with a time interval at least one screen dot, and with a detector for measuring the light power of the fluorescent light emitted by the minimum of one screen dot.

BACKGROUND OF THE INVENTION

In scanning microscopy, a sample is illuminated with a light beam in order to observe the reflection or fluorescent light emitted by the sample. The focus of an illumination light beam is moved in an object plane with the help of a controllable beam deflector, generally by tipping two mirrors in an object plane, whereby the axes of deflection are usually positioned perpendicular to each other, so that one mirror deflects in the x-direction and the other in the y-direction. The mirrors are tipped with the help, for example, of galvanometric positioners. The power of the light coming from the object is measured dependent on the position of the scanning beam. Generally, the positioners are provided with sensors to determine the actual position of the mirrors.

In confocal scanning microscopy in particular, an object is scanned in three dimensions with the focus of a light beam.

A confocal scanning microscope generally comprises a light source, a focusing optic with which the light from the source is focused on a pinhole aperture—the so-called excitation aperture—, a beam splitter, a beam deflector to control the beam, a microscope optic, a detection aperture, and detectors to detect the detection or fluorescent light. The illumination light is coupled via a beam splitter. The fluorescent or reflection light coming from the object returns to the beam splitter via the beam deflector, passes through it, and finally focuses on the detection aperture, behind which are the detectors. Detection light that does not originate directly from the focal region takes another light path and does not pass through the detection aperture, so that pixel information is obtained that leads to a three-dimensional image as a result of sequential scanning of the object. In most cases, a three-dimensional image is achieved by layered data imaging, whereby the path of the scanning light beam ideally describes a meander pattern on or in the object. (Scanning a line in the x-direction at a constant y-position, then interrupting x-scanning and y-repositioning to the next line to be scanned, and then scanning this line at a constant y-position in negative x-direction, etc.). To enable layered data imaging, the sample table or the objective is repositioned after scanning a layer so that the next layer to be scanned is brought into the focal plane of the objective.

When analyzing biological samples with a so-called FRAP (fluorescence recovery after photobleaching), the temporal recovery behavior of a sample region after a bleaching process is analyzed. A scanning microscope is known from DE 102 33 549 A1 which may, among other things, be used for FRAP analysis. The scanning microscope has a light source that emits an illumination light beam for illuminating a sample. The illumination light beam passes along an illumination beam path and can be guided over or through a sample, as the case may be, by a beam deflector. A further light source that emits a manipulation light beam is provided, which passes along the manipulation beam path. Both the manipulation light beam and the illumination light beam are guided over or through the sample, as the case may be, by the beam deflector.

A laser scanning microscope with at least two light sources and two beam deflectors is known from U.S. Pat. No. 6,094,300. Each of the light sources is assigned to a beam deflector. The laser light beams emitted by the light sources can scan the sample independently of each other with both of the beam deflectors.

A method for scanning a region of interest of a sample is known from U.S. Pat. No. 2002/0196535 A1, whereby different scan lines are scanned under various conditions of illumination.

SUMMARY OF THE INVENTION

It is an object of the present invention to disclose a method for analyzing biological samples with a scanning microscope, which, based on hitherto unused parameters, enables conclusions to be drawn about the characteristics and/or the composition of a sample or of a sample region, as the case may be.

This object is solved by a method characterized by the following steps:
a) Illumination of at least one screen dot with a manipulation light beam and, at a temporal interval, with an excitation light beam;
b) Measurement of the power of the fluorescent light emitted by the minimum of one screen dot;
c) Assignment of the measured power to the temporal interval in a data set;
d) Illumination of the minimum of one screen dot and/or at least one other screen dot with the manipulation light beam, and in a changed temporal interval with the excitation light beam;
e) Measurement of the power of the fluorescent light emitted by the minimum of one screen dot and/or by the other screen dot; and
f) Assignment of the measured power to the changed temporal interval in the data set.

It is a further object of the invention to disclose a scanning microscope that enables the determination of hitherto unused parameters for analyzing the characteristics and/or the composition of a sample, and to provide these to the user.

This object is solved by a scanning microscope, whereby the manipulation light beam and the excitation light beam are directable onto the screen dots, and whereby the scanning microscope comprises an adjustment device for adjusting the temporal interval; a processing unit that assigns the particular measured power to the particular temporal interval, thereby producing a data set; and a database module for saving the data set.

The invention has the advantage that the long time required in conventional bleaching experiments between bleaching and capturing the initial data after bleaching can, according to the invention, be drastically reduced. Advantageously, dark states may be analyzed with the method according to the invention. Up to now, this was either not possible with scanning microscopy, or only indirectly possible. Up to now, it was assumed that the fluorophores in the bleached sample region were largely completely and irreversibly destroyed, for example, by the formation of radicals. In fact, however, there is generally also an excitation in longer-lived states (order of magnitude: µs), which could not, however, be observed with a scanning microscope up to now.

In a preferred variant of the method according to the invention, at least one screen dot is repeatedly and successively illuminated with a manipulation light beam and an excitation light beam. The temporal interval between illumination with the manipulation light beam and illumination with the excitation light beam is changed, and the fluorescent light yield is measured, depending on the temporal interval. Conclusions relating to the characteristics and/or the composition of the sample may be drawn from the dependence of the fluorescent light yield on the temporal interval.

For example, in fluorescence correlation spectroscopy (FCS tests) long-live triplet states play a very distorting rule because a fluorophore that is excited in a triplet state appears invisible for a long time. The method according to the invention can therefore be reasonably used to analyze FCS tests.

The data set may be expanded by a singular or multiple repetition of the respective steps d)-f) with a changed temporal interval, whereby the minimum of one and/or other screen dots are illuminated.

In a preferred embodiment of the invention, the data set obtained may be presented graphically, for example in an x-y diagram.

The manipulation light beam and the excitation light beam may, in one embodiment of the invention, each have a portion of same wavelength. In a further embodiment, the manipulation light beam and the excitation light beam each have at least one portion of a different wavelength.

In a particularly preferred embodiment, the manipulation light beam bleaches the sample in a previously selected sample region.

In another variant, the manipulation light beam serves the targeted activation of fluorescent dyes and/or the release of fluorescent dyes. The fluorescent dyes may preferably be photoactive fluorescent proteins and/or molecules that may be switched on or off by the action of light. It is possible in one variant to activate a fluorescent dye (e.g., GFP) with the manipulation light beam, that is, to "turn it on" to some extent. For this purpose, the manipulation light beam may, for example, have a wavelength of 405 nm. This manipulation leads to a change in the fluorescent dye, which may then be excited by the excitation light beam which, for example, may have a wavelength of 480 nm. The emission of fluorescent light in the aforementioned example occurs at approximately 520 nm. With the method according to the invention, one can track how rapidly photoactivation (confirmation change) takes place. According to the invention, it is possible to some extent to produce a measurement protocol of photoactivation.

Advantageously, the detectors of the scanning microscope according to the invention are not "blinded" by the light of the manipulation light beam because, according to the invention, they only receive light from the screen dots that are currently being illuminated by the excitation light beam. As a result, there is no detector dead time with the scanning microscope according to the invention so that, as previously mentioned, even states that are excited during bleaching (lifetime in the µs range) may be analyzed.

In a preferred variant, the position of the manipulation light beam in the sample (i.e., the orientation of the screen dot to be illuminated) is controlled with a beam deflector. The beam deflector may, for example, be comprised of one or several galvanometric mirrors.

In a variant, a further beam deflector is provided, which controls the position of the excitation light beam in the sample.

A variant is particularly preferred in which the position of the excitation light beam in the sample is controlled with a beam deflector, which also controls the position of the manipulation light beam in the sample. In this variant, both the manipulation light beam and the excitation light beam are passed via the beam deflector and preferably have a zero degree difference in angles in relation to each other, so that the temporal interval is changeable by varying this angle. For example, the angle may be changed from line to line in order to set a different temporal interval for each line.

Preferably, the manipulation light beam and the excitation light beam are passed line by line over or through the sample. The scanning path is here preferably implemented in a meander pattern. At faster scanning motions, this meander pattern will naturally approach the form of a sinus curve as a result of the inertia of the beam deflector.

In a particular embodiment, the temporal interval between illumination with the manipulation light beam and illumination with the excitation light beam can be varied by varying the deflection speed of the beam deflector.

In a further embodiment, the manipulation light beam is directed via a beam deflector and the excitation light beam via a further beam deflector. The one beam deflector and the further beam deflector are preferably synchronized with each other such that the temporal interval may be changed by varying the phase between the one beam deflector and the further beam deflector.

In a variant, illumination with the manipulation light beam is effected during line sweep, and illumination with the excitation light beam during line return. In this variant, the temporal interval may result from varying the spatial distance between the screen dot to be illuminated and the turning point of the line sweep and line return. Preferably, the screen dots to be illuminated lie along an image diagonal.

The scanning microscope according to the invention preferably comprises a multiband detector. If one combines two different fluorochromes on one and the same proteins or molecule carrier, one obtains a single diffusion rate during FCS tests in two color channels, however, potentially different conclusions regarding the dark states.

The scanning microscope is preferably implemented as a confocal scanning microscope.

BRIEF DESCRIPTION OF THE DRAWINGS

The subject of the invention is schematically represented in the diagrams and is described below based on the figures, whereby components that function in the same manner are given the same reference numbers. They show.

DETAILED DESCRIPTION OF THE INVENTION

Figure 1:
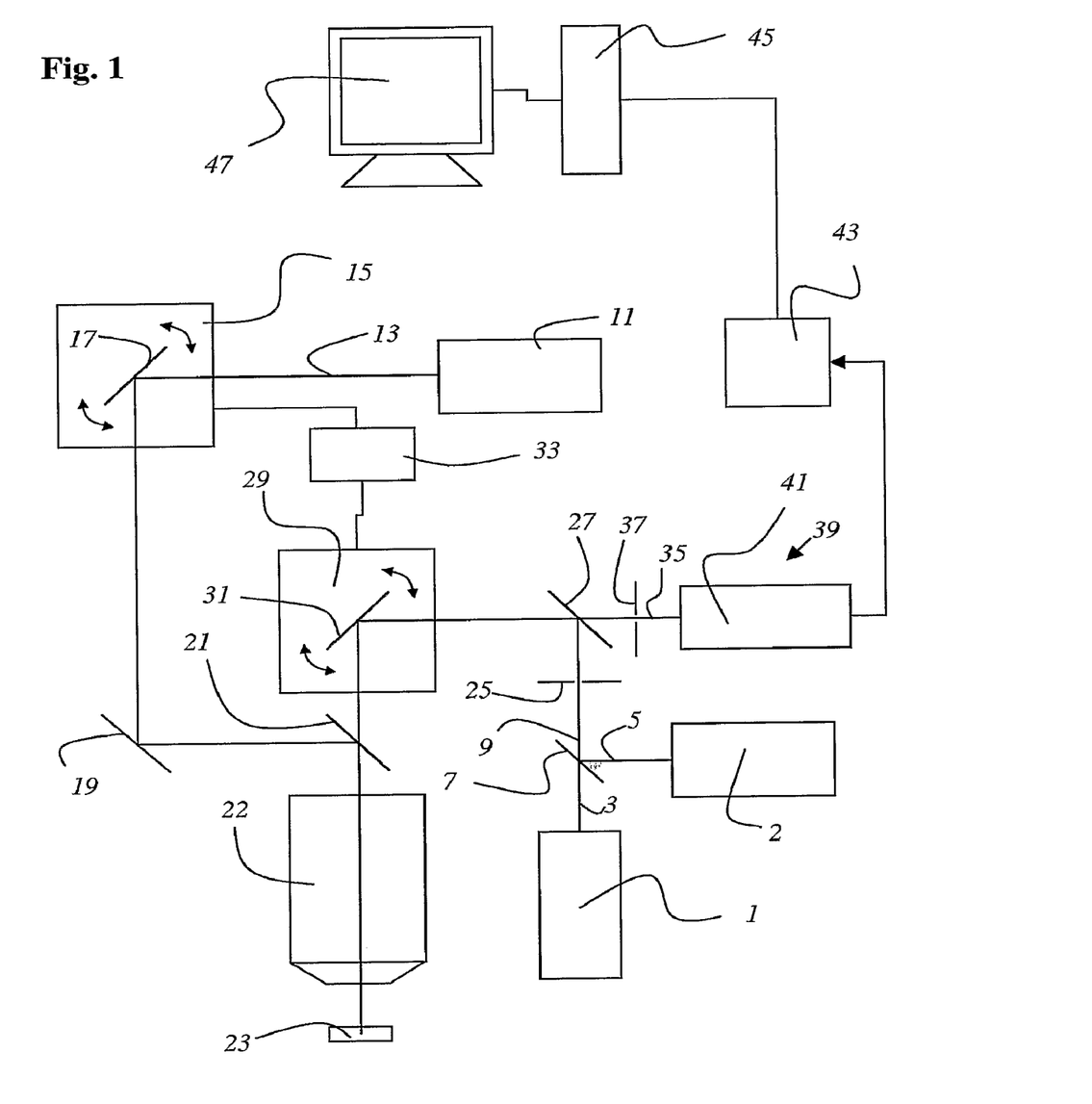
FIG. 1 a scanning microscope according to the invention.

FIG. 1 shows a scanning microscope according to the invention with a first light source 1 and a further light source 2, which emit light beams 3, 5 of different wavelengths, which are united by a dichroic beam splitter 7 to form an excitation light beam 9. The scanning microscope comprises a third light source 11, which emits a manipulation light beam 13. The manipulation light beam 13 arrives at the beam deflector 15, which comprises a cardanically suspended scanning mirror 17, and therefrom via the deflection mirror 19 and the neutral beam splitter 21 via a the scanning optic, which is not shown in this representation, and the tube optic, which is also not shown, arrives at the microscope objective 22, which focuses the manipulation light beam 13 onto the sample 23. The position of the manipulation light beam 13 in the sample or the position of the focus of the manipulation light beam 13 in the sample 23 is adjustable with the help of the beam deflector 15. The excitation light beam 9 passes the illumination pinhole aperture 25 and arrives at the main beam splitter 27, which directs the excitation light beam to the further beam deflector 29, which comprises a further cardanically suspended scanning mirror 31. The further beam deflector 29 directs the excitation light beam through the neutral beam splitter 21, the scanning optic, which is not shown, and the tube optic, which is also not shown, and to the microscope objective 21, which focuses the excitation light beam onto the sample 23. The position of the focus of the excitation light beam on the sample 23 is adjustable with the further beam deflector 29. It is provided in the shown embodiment that the manipulation light beam 13 and the excitation light beam 9 are guided line by line over the scanning field that is to be scanned, whereby the focus of the manipulation light beam 13 advances ahead of the focus of the excitation light beam 9. The beam deflector 15 and the further beam deflector 29 are synchronized to each other via the electronic unit 33. The temporal interval between the arrival of the focus of the manipulation light beam 13 and the focus of the excitation light beam 9 at a screen dot to be illuminated may be adjusted by adjusting the relative phase between the two beam-deflecting cardanically suspended scanning mirrors 17 and 31. The fluorescent light 35 emitted by the sample reaches the neutral beam splitter 21, the microscope objective 21, and via the further beam deflector 29 back to the main beam splitter 27, passes through it and the subsequent detection pinhole aperture 37 and finally arrives at the detector 39, which is implemented as a multiband detector 41. In the detector, wavelength-specific electrical signals are produced, which are electrically proportional to the respective light power of the fluorescent light portions, and are transmitted on to a processing unit 43. The processing unit orders the measured powers of the respective temporal intervals between the manipulation light beam 13 and the excitation light beam 9 and produces a data set, which is transmitted to a PC 45, on the monitor 47 of which is graphically displayed the dependence of the fluorescent light yield on the temporal interval.

Figure 2:
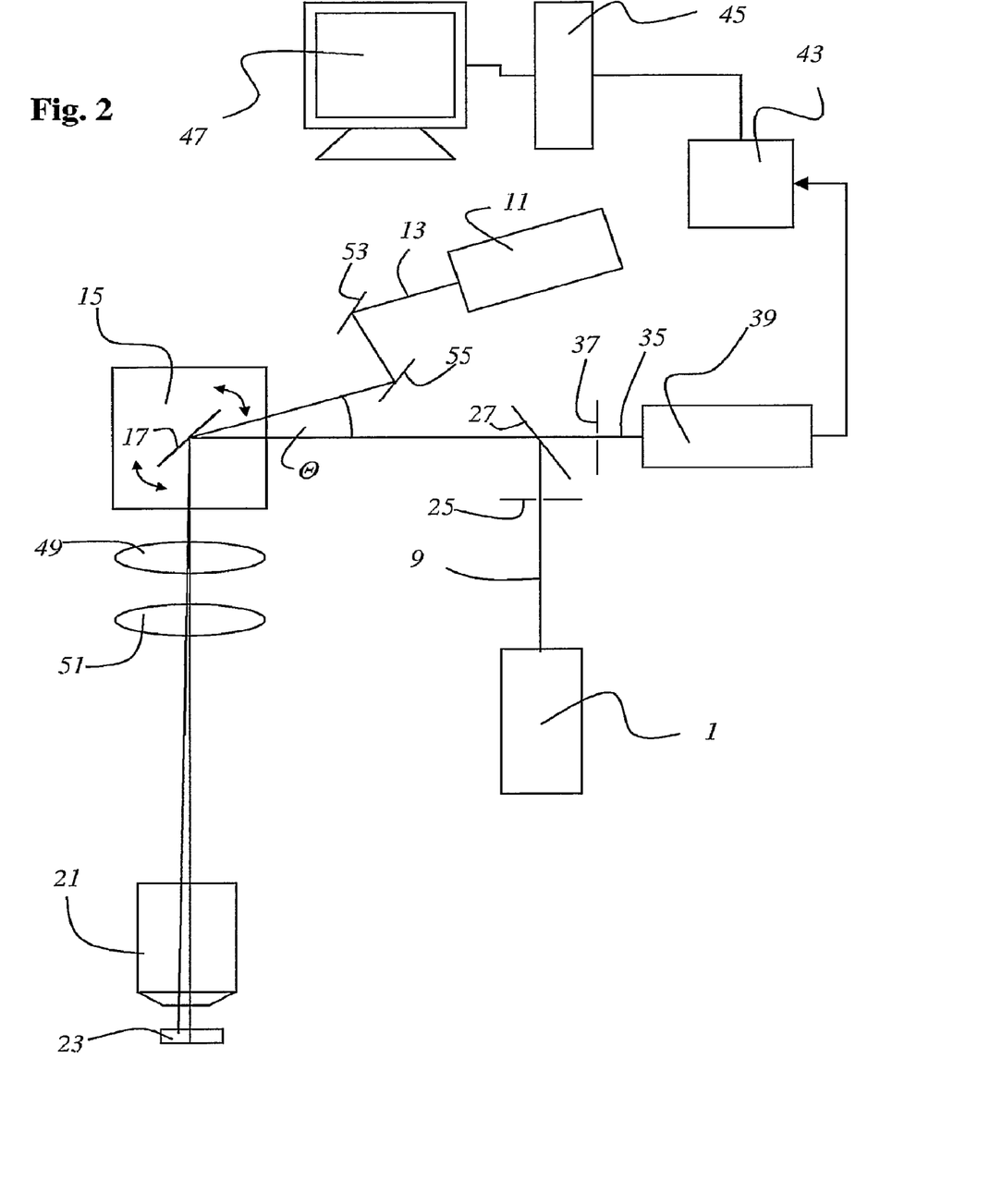
FIG. 2 a further scanning microscope according to the invention.

FIG. 2 shows a further scanning microscope according to the invention with a light source 1, which produces a stimulation light beam 9 which, after passing the illumination pinhole aperture 25, is directed by the main beam splitter 27 to the beam deflector 15, which comprises a cardanically suspended scanning mirror 17. The beam deflector 15 guides the excitation light beam 9 through the scanning optic 49, the tube optic 51 and through the microscope objective 21, and over or through the sample 23. The scanning microscope according to the invention comprises a further light source 11, which emits a manipulation light beam 13, which is also guided by the beam deflector 15 through the scanning optic 49, the tube optic 51, and through the microscope objective 21, and over or through the sample 23. Before striking the beam deflector 15, the manipulation light beam 13 and the excitation light beam 9 are at an angle θ to each other. This angle establishes the spatial distance of the focuses of the manipulation light beam 13 and the excitation light beam 9 on the sample. From the knowledge of the beam deflector speed, there results therefrom the temporal interval between the arrival of the manipulation light beam 13 and the excitation light beam 9 on a screen dot to be illuminated. This temporal interval may be adjusted by changing the angle. To change the angle θ, the manipulation light beam 13 is directed by a first adjustable deflection mirror 53 and a second adjustable deflection mirror 55. The first and the second adjustable deflection mirrors 53, 55 are adjusted such that the manipulation light beam 13 always strikes the cardanically suspended scanning mirror 17 at the same place, independent of the angle θ. The fluorescent light 35 emitted by the sample arrives through the microscope objective 21, the tube optic 51, the scanning optic 49 via the beam deflector 15 and returns to the main beam splitter 27, passes through it and the subsequent detection pinhole aperture 37 and finally arrives at the detector 39, which produces electrical signals proportional to the light power of the fluorescent light and transmits them to a processing device 43. In the processing device 43, the detection signals are allocated to the respective temporal intervals and transmitted to a PC 45 with a monitor 47.

Figure 3:
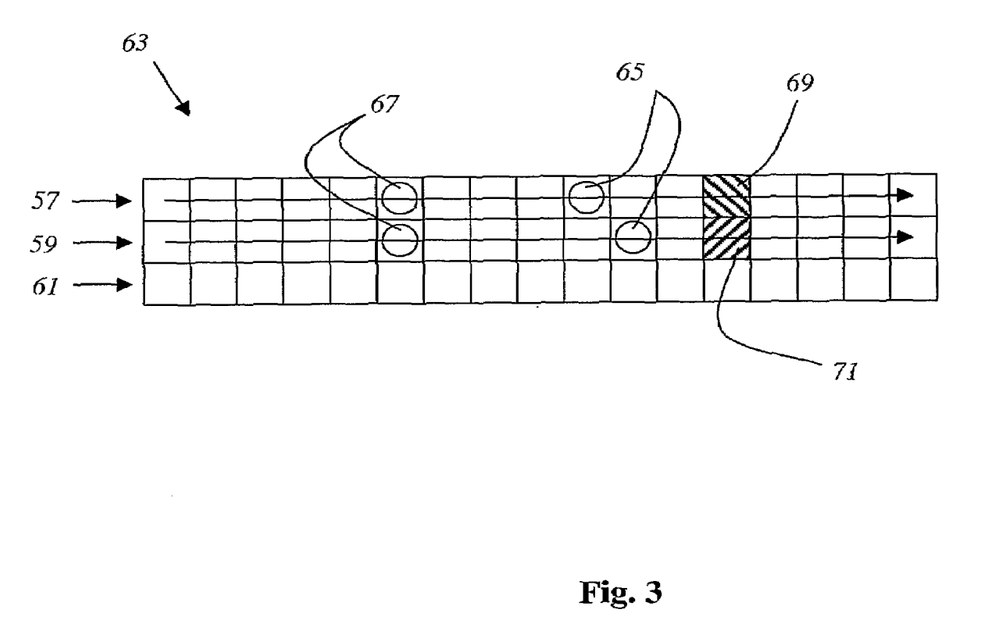
FIG. 3 an illustration of the process of illumination of screen dots by the method according to the invention.

FIG. 3 shows examples of the first three scanlines 57, 59, 61 of a scan field 63 to be scanned. When scanning the first scanline 57, the manipulation light beam focus 65 is a distance of three screen dots from the excitation light beam focus 67. The manipulation light beam focus 65 and the excitation light beam focus 67 are guided together at a constant distance along the scanline 57. The temporal interval between the arrival of the two focuses at the screen dot 69 to be illuminated may be calculated from the spatial distance between the manipulation light beam focus 65 and the excitation light beam focus 67 (in this case three screen dots) and from the scanning speed with which the focuses are guided over the scanline 57. When scanning the two scanlines 59 the spatial distance between the manipulation light beam focus 65 and the excitation light beam focus 67 has been increased by one screen dot. As a result, the temporal interval of the arrival of the focuses at the further screen dot 71 to be illuminated is increased at a presumed constant scan speed. The manipulation light beam focus 65 and the excitation light beam focus 67 may, for example, be directed together in a scanning microscope by a beam deflector 15, as represented in FIG. 2. In the arrangement shown in FIG. 2, no reflected manipulation light reaches the detector 39 because the detector can only receive light that is emitted by the screen dot that is currently illuminated by the excitation light beam. The detector "doesn't look anywhere else."

Figure 4:
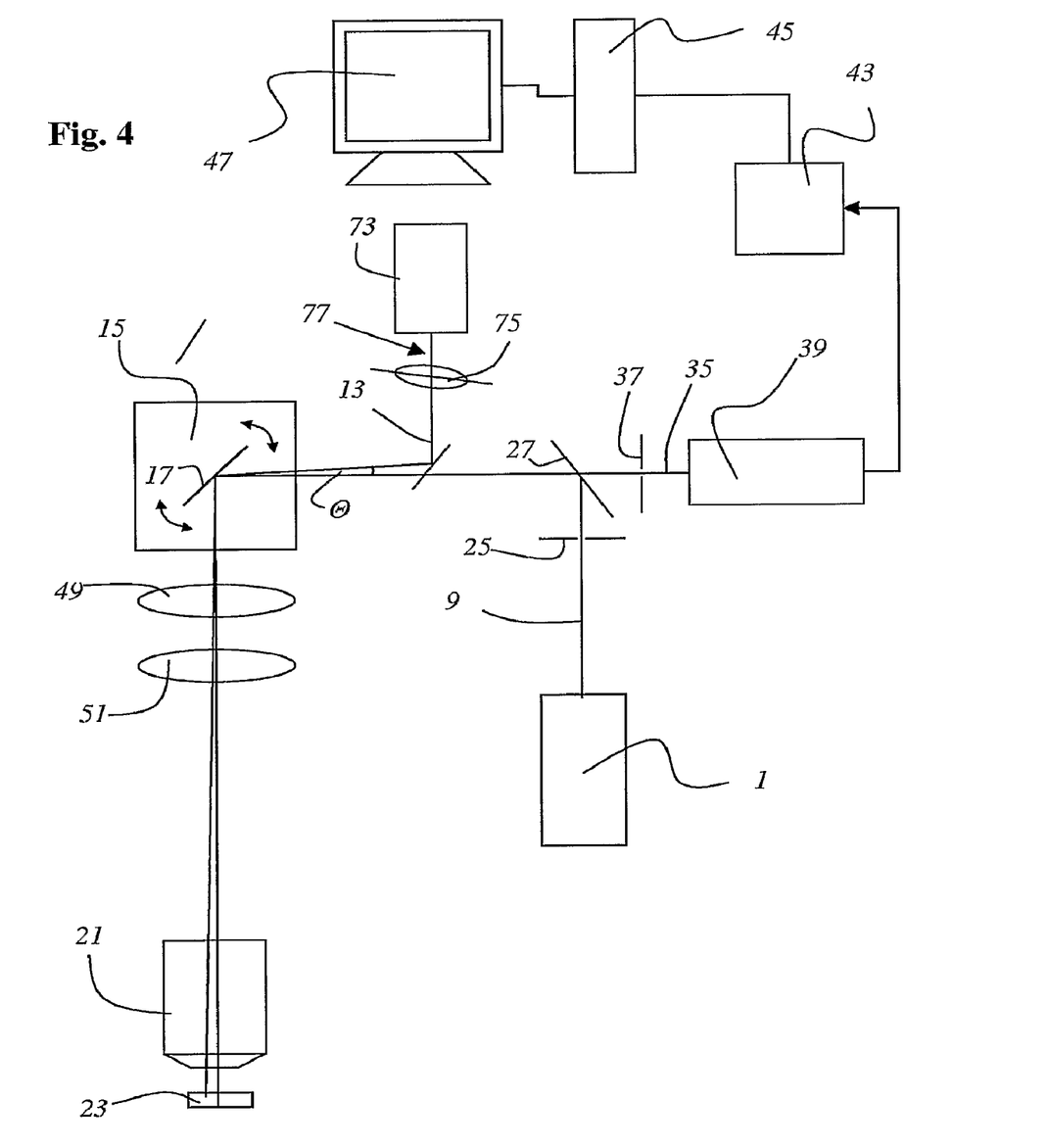
FIG. 4 a further scanning microscope according to the invention.

FIG. 4 shows a further scanning microscope according to the invention. The scanning microscope has a UV laser 73. In this scanning microscope, the light beam 77 of the UV laser 73 is generally used to excite the sample in the customary imaging mode. In this embodiment, the light beam 77 is, however, used as a manipulation light beam 13. By tipping the pinhole optic 75 in the beam path of the light beam 77, the light beam 77 strikes the scanning mirror 17 at an angle θ. The angle θ, and thus the temporal interval, may be varied by adjusting (lateral displacement and/or tipping) the pinhole optic 75.

The invention was described in relation to a particular embodiment. However, it is clear that changes and variations may be implemented without abandoning the scope of the following claims.

The invention claimed is:

1. A method for analyzing biological samples with a scanning microscope comprising the following steps:
   a) illuminating of at least one screen dot with a manipulation light beam and, at a temporal interval, with an excitation light beam;
   b) measuring of the power of the fluorescent light emitted by the minimum of one screen dot;
   c) assigning of the measured power to the temporal interval in a data set;
   d) illuminating of the minimum of one screen dot and/or at least one other screen dot with the manipulation light beam, and in a changed temporal interval with the excitation light beam;
   e) measuring of the power of the fluorescent light emitted by the minimum of one screen dot and/or by the other screen dot; and
   f) assigning of the measured power to the changed temporal interval in the data set.

2. Method according to claim 1, characterized by the further step:
   expanding of the data set by singular or multiple repetition of steps d) to f), each time further changing the temporal interval, whereby the minimum of one and/or other screen dots, as the case may be, are illuminated.

3. Method according to claim 1, wherein the manipulation light beam and the excitation light beam each have at least one portion of the same wavelength.

4. Method according to claim 1, wherein the manipulation light beam and the excitation light beam each have at least one portion of a different wavelength.

5. Method according to claim 1, wherein the manipulation light beam bleaches the sample.

6. Method according to claim 1, wherein the manipulation light beam activates at least one fluorescent dye and/or releases one fluorescent dye.

7. Method according to claim 1, wherein the fluorescent dye comprises photo active fluorescent proteins, in particular PA-GFP and/or KFP and/or KAEDE.

8. Method according to claim 1, wherein the position of the manipulation light beam in the sample is controlled by a beam deflector.

9. Method according to claim 8, wherein the position of the excitation light beam in the sample is controlled by a further beam deflector.

10. Method according to claim 8, wherein the position of the excitation light beam in the sample is controlled by the one beam deflector.

11. Method according to claim 9, wherein the manipulation light beam and the excitation light beam are guided line by line over or through the sample.

12. Method according to claim 11, wherein the excitation light beam and the manipulation light beam are guided in a meander pattern over or through the sample.

13. Method according to claim 10, wherein the manipulation light beam advances ahead of the excitation light beam.

14. Method according to claim 13, wherein the beam deflector has a deflection speed, and wherein the temporal interval is changed by varying the deflection speed.

15. Method according to claim 9, wherein the one beam deflector and the further beam deflector are synchronized with each other, and wherein the temporal interval is changed by varying the phase between the one beam deflector and the further beam deflector.

16. Method according to claim 10, wherein the manipulation light beam and the excitation light beam have an angle to each other that differs by 0 degrees, and wherein the temporal interval is changed by varying the angle.

17. Method according to claim 8, wherein one illumination with the manipulation light beam is effected during line sweep, and illumination with the excitation light beam during line return.

18. Method according to claim 17, wherein the temporal interval is effected by varying the distance between the screen dot to be illuminated and the turning point of the line sweep and line return.

19. Method according to claim 1, wherein the illuminated screen dots lie on the image diagonal.

20. Method according to claim 1, wherein the temporal interval during scanning of a scanline and/or the scanning of an object field (frame) is varied.

21. Method according to claim 1, wherein the data set is displayed graphically.

22. Method according to claim 1, wherein use is made to analyze dark states of the sample.

23. Scanning microscope for implementing a method according to claim 1.

24. Scanning microscope with at least one light source for producing a manipulation light beam and a excitation light beam, which successively illuminate with a temporal interval at least one screen dot, and with a detector for measuring the light power of the fluorescent light emitted by the minimum of one screen dot, wherein the manipulation light beam and the excitation light beam are directable repeatedly and successively on to the screen dot, and wherein the scanning microscope comprises a changing device for changing the temporal interval; a processing device, which assigns the respective measured power to the respective temporal interval, thereby producing a data set; and a database module for saving the data set.

25. Scanning microscope according to claim 24, wherein one beam deflector is provided with which the position of the manipulation light beam in the sample is adjustable.

26. Scanning microscope according to claim 25, wherein the position of the excitation light beam in the sample is adjustable with the one beam deflector.

27. Scanning microscope according to claim 25, wherein a further beam deflector is provided with which the position of the manipulation light beam in the sample is adjustable.

28. Scanning microscope according to claim 24, wherein the manipulation light beam and the excitation light beam are together directed line by line over or through the sample.

29. Scanning microscope according to claim 28, wherein the manipulation light beam and the excitation light beam are together directed in a meander pattern over or through the sample.

30. Scanning microscope according to claim 24, wherein the illumination light beam advances ahead of the excitation light beam.

31. Scanning microscope according to claim 26, wherein the one beam deflector has a deflection speed, and wherein the temporal interval is changeable by varying the deflection speed.

32. Scanning microscope according to claim 27, wherein the one beam deflector and the further beam deflector are synchronized with each other, and wherein the temporal interval is changeable by varying the phase between the one beam deflector and the further beam deflector.

33. Scanning microscope according to claim 24, wherein the manipulation light beam and the excitation light beam have an angle to each other that differs by 0 degrees, and wherein the temporal interval is changeable by varying the angle.

34. Scanning microscope according to claim 28, wherein one illumination with the manipulation light beam is effected during line sweep and one illumination with the excitation light beam during line return.

35. Scanning microscope according to claim 34, wherein the temporal interval is changeable by varying the distance between the screen dot to be illuminated and the turning point of the line sweep and line return.

36. Scanning microscope according to claim 24, wherein the detector comprises a multiband detector.

37. Scanning microscope according to claim 24, wherein the scanning microscope is a confocal scanning microscope.

* * * * *